Patented Mar. 8, 1938

2,110,270

UNITED STATES PATENT OFFICE 2,110,270

BIS-DIAZO-DIIMINO COMPOUNDS

Eugene A. Markush, Jersey City, Mark S. Mayzner, Asbury Park, and Julius Miller, Newark, N. J., assignors to Pharma Chemical Corporation, New York, N. Y., a corporation of New York No Drawing. Application January 18, 1935, Serial No. 2,355

11 Claims. (Cl. 260—69)

Our invention relates to new dye producing compositions and comprises the process of making these products, the products themselves, means for applying the same, and the results produced thereby.

We have found that by condensing 2 molecules of an aromatic diazo compound or nitrosamine, or 1 molecule of a tetrazo compound with 1 molecule of aliphatic diamino compound containing water-solubilizing groups, new and heretofore unknown derivatives are obtained, which are characterized by the general formula:—

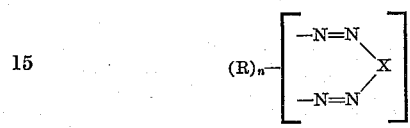

in which R is the residue of a diazotized aromatic amine, n being 2 when R is the residue of a diazotized aromatic amine, n being 1 when R is the residue of a tetrazotized aromatic amine, X—X is the residue of an aliphatic diimino compound containing a water-solubilizing group and which may contain halogen, hydroxy, nitro, alkyl, aralkyl, and aryl substitutions, the —N=N— groups being combined with the imino groups of the aliphatic diimino compound.

We designate these products as aliphatic bis-(diazo-imino) compounds.

These products when mixed with coupling components produce stable compositions which yield valuable dyes in substance, as well as in dyeing and printing processes.

We give the following as examples of our invention:—

Example 1

158 parts (by weight) 4-chlor-2-amino-anisol are dissolved in 400 parts water and 270 parts hydrochloric acid 20° Bé. The solution is cooled with ice and diazotized in the usual manner with 70 parts sodium nitrite dissolved in 280 parts of water.

97 parts ethylene-diimine-diacetic acid, or ethylene-bis-(imino-acetic acid) are dissolved in about 1000 parts water containing 200 parts of sodium carbonate, cooled to 8°–10° C. and the solution of the above diazonium is added slowly.

When about one third of the diazonium has been added, a white crystallin precipitate of the bis-(diazo-imino) compound appears. After all has been added, the stirring is continued for one hour and a spot test on filter paper with an alkaline solution of 1-amino-8-naphthol-3.6-disulfonic acid shows no presence of diazonium, the precipitate is filtered, pressed and dried. A cream colored powder is obtained. The yield is 300 parts.

The compound is clearly soluble in water, stable to alkalies and in presence of acids easily splits to reform the 4-chlor-2-diazo-anisole and ethylene-diimino-diacetic acid. Its probable formula is:—

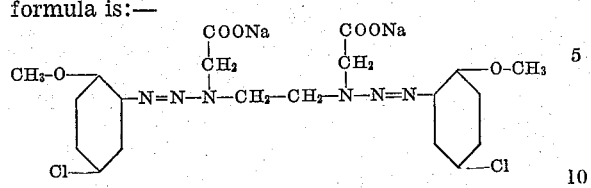

Example 2

142 parts 4-chlor-2-amino-toluol are diazotized in the well known manner with hydrochloric acid and sodium nitrite. The clear diazonium solution is added slowly with good stirring to a solution of 151 parts ethylene-bis-(imino-iso-butyric acid) di-sodium salt Berichte (44, 1135 (1911)) in 1000 parts water and 200 parts sodium carbonate.

The whole is kept at 10° C. When all diazonium has been introduced and complete condensation effected, the precipitated bis-(diazoimino) body is filtered, pressed and dried. A brownish powder is obtained with a yield of 370 parts. It is well soluble in water, stable to drying, grinding and heat and on treatment with acids is reconverted into 4-chlor-2-diazo-toluol and ethylene-bis-(imino-iso-butyric acid). Its formula is in all probability:—

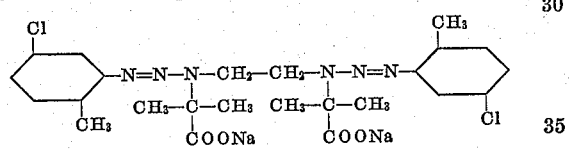

Example 3

In a similar manner, the diazonium of 185 parts ortho-amino-diphenyl-ether is condensed with 155 parts of the disodium salt of pentamethylene-bis-(alpha-imino-propionic acid) (Berichte 47, 2413 (1914)).

The bis-(diazo-imino) compound is isolated by the addition of salt, filtered, pressed and dried. The cream colored compound shows similar properties to the above mentioned compounds. Its probable formula is:

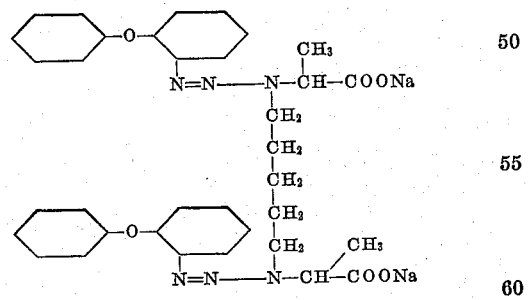

Example 4

122 parts of dianisidine are pasted in 200 parts water at 40° C. 130 parts of 20° Bé. hydrochloric acid are added and the whole stirred at 40° C., until complete solution has been reached. Sufficient ice is added to cool to 0° C., and 140 parts additional hydrochloric acid are added, followed immediately by a solution of 70 parts of sodium nitrite in 300 parts of water. The resulting clear tetrazo solution is entered slowly into a 5° C. solution of 125 parts ethylene-bis-(iminoacetic acid) disodium salt in 1000 parts of water and 250 parts soda ash.

The addition should take at least one hour. When all is in, stirring is continued for 24 hours and the temperature never allowed to rise above 8° C.

The solution is then saturated with solid salt and heated very slowly to 70°–75° C. A yellow precipitate appears. Allow to cool to room temperature and filter, press and dry. The yield is 430 parts.

The compound is a yellowish crystallin powder, extremely soluble in water. Upon treating with acids it regenerates tetrazo-dianisidine and ethylene-bis-(imino-acetic-acid). Its probable formula is:—

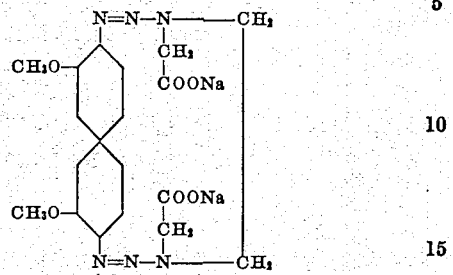

The following chart illustrates some of the various bis-(diazo-imino) compounds prepared by us. The scope of our invention is not limited to these mentioned. They are prepared in the manner described in the above mentioned examples.

| Amine diazotized | Stabilizer | Probable formula |
|---|---|---|
| (1) Benzidine | Trimethylene-bis-(imino-acetic acid). | |
| (2) Tolidin | Trimethylene-bis-(imino-acetic acid). | |
| (3) Dianisidin | Pentamethylene-bis-(imino-acetic acid). | |
| (4) 4′ methyl-2-amine diphenyl-ether | Trimethylene-bis-(imino-iso-butyric acid). Berichte 58, 1879 (1925) | |

| Amine diazotized | Stabilizer | Probable formula |
|---|---|---|
| (5) 4-benzoylamino-2-amino toluol | Penta-methylene-bis-(imino-propionic acid) Berichte 47, 2413 | |
| (6) Meta chloroaniline | 2,3 diphenyl piperazin-bis-(2,3 dicarboxylic acid). Berichte 47, 2409 | |
| (7) 4-amino-2-benzoylamino-toluene | Ethylene-bis-(imino-acetic acid). | |
| (8) 2-amino-4-benzoylamino methoxy benzol | Ethylene-bis-(imino-diacetic acid). | |
| (9) 2-5 dichloroaniline | Trimethylene-bis-(imino-phenyl-acetic acid). Berichte 58, 1880 (1925) | |

| Amine diazotized | Stabilizer | Probable formula |
|---|---|---|
| (10) Alpha-amino-anthraquinone | Trimethylene-bis-(imino-propionic acid). | |
| (11) 2-5-diethoxy-4-phenoyl-amino-1-amino-benzene | Ethylene-bis-(imino-propionic acid). Berichte 45, 1489 (1912) | |
| (12) 1-amino-4-benzoyl-methyl-amino-benzol. | Methylene-bis-(imino-acetic acid). | |
| (13) P P'-diamino-diphenyl-ethyl-enether. | Methylene-bis-(imino-acetic acid). | |
| (14) 1-methoxy-2-amino-4-chlor-benzol. | Methylene-bis-(imino-acetic acid). | |
| (15) 1-methyl-2amino-4-chlor-benzene. | Methylene-bis-(imino-acetic acid) | |

In the following we record additional amines and diimino compounds applied in support of our invention.

The mechanics of the reaction in each case are alike and identical with those specified in the examples with only minor changes or adjustments.

Amines and diamines 4-chloro-2-amino-1-methoxy-benzene,
2,5-dichlor-1-methyl-4-aminobenzene,
5-nitro-2-amino-1-methylbenzene,
3-chloro-1-aminobenzene,
2-amino-4-methoxy-5-benzoylamino-1-chlorobenzene,
2,5-dichloro-4-amino-1-methylbenzene,
4,6-dichlor-2-amino-1-methylbenzene,
4-nitro-2-amino-1-methoxybenzene,
4-amino-1,3-dimethylbenzene,
4,5-dichloro-2-amino-1-methylbenzene,
5-nitro-2-amino-1-methoxybenzene,
3-amino-4-methoxy-6-nitro-1-methylbenzene,
3-amino-4-methoxy-6-benzoylamino-1-methylbenzene,
6-amino - 4 - benzoylamino-1,3-dimethoxybenzene,
4,4'-diamino-3,3'-dimethoxy-diphenyl,
6-amino-3-benzoylamino-1,4- diethoxybenzene,
4-chloro-2-amino-1-methyl-benzene,
4-nitro-4'-amino-2',5'-dimethoxyazobenzene,
3-nitro-4'-amino-2',5'-dimethoxyazo - benzene,
4 - methyl-4'amino-2-methoxy - 5 - methylazobenzene,
o-chloraniline,
p-chloraniline,
2,6-dichloraniline,
2,5-dichloraniline,
Alpha-amino-anthraquinone,
Ortho-amino-azo-toluene,
Alpha-naphthylamine,
Beta-naphthylamine,
3-chlor-alpha-naphthylamine,
6-chlor-beta-naphthylamine,
3-nitro-alpha-naphthylamine,
4-methyl-beta-naphthylamine,
4-ethoxy-alpha-naphthylamine.

Diimino compounds

Trimethylene-bis (imino-salicyl-acetic acid)

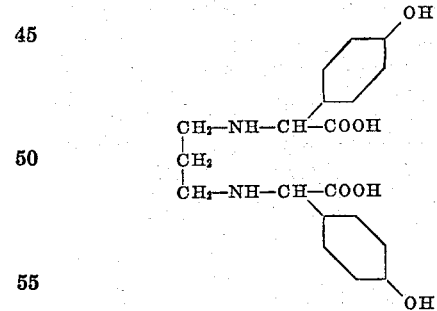

Ethylene-bis-(imino-nitro-phenyl-acetic acid)

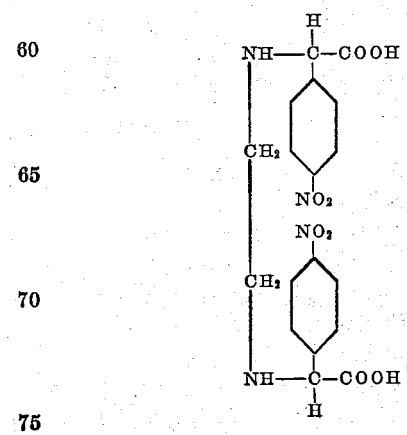

Trimethylene-bis-(alpha-imino-octan acid)
(B. 58, 1881 (1925))

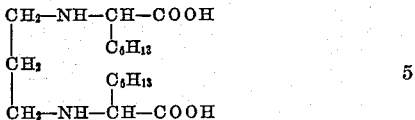

Ethylene-bis-(alpha-imino-phenyl-acetic acid)
(B. 45, 1487 (1912))

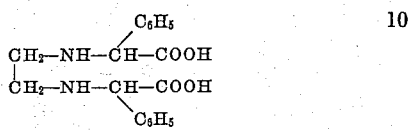

Ethylene-bis-(alpha-imino-alpha-phenyl-propionic acid)
(B. 45, 1491 (1912))

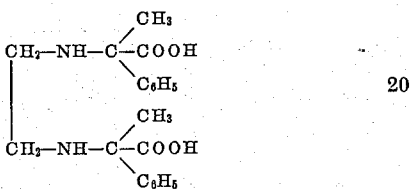

Ethylene-bis-(alpha-imino-diphenyl-acetic acid) (B. 45, 1492 (1912))

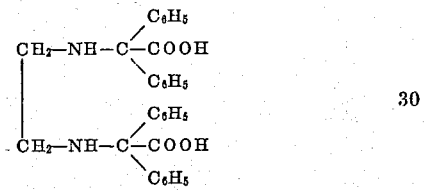

Ethylene-bis-(imino-sulpho-phenyl-acetic acid)

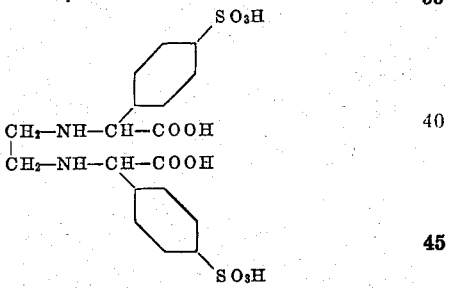

Ethylene-bis-(imino-methyl-omega-sodium sulfonate)

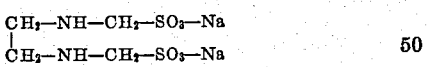

Beta-methoxy-trimethylene-bis-(imino-acetic-acid)

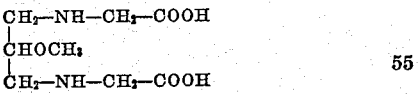

Dimethyl-trimethylene-bis-(imino-acetic acid)

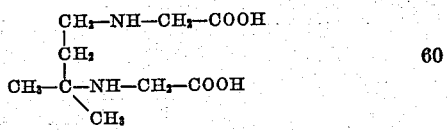

Mono-chlor-ethylene-bis-(imino-acetic acid)

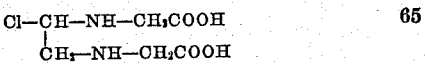

Methylene-bis-(imino-propionic acid)

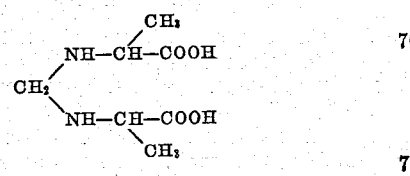

Methylene-bis-(imino-isobutyric acid)

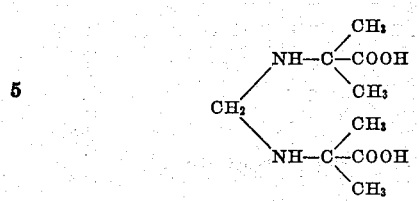

Methylene-bis-(imino-phenyl-methyl-acetic-acid)

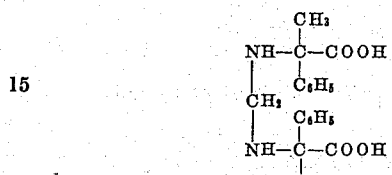

Methylene-bis-(imino-phenyl-acetic acid)

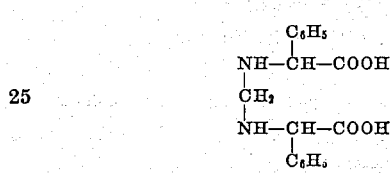

Methylene-bis-(imino-bis-diphenyl-acetic-acid)

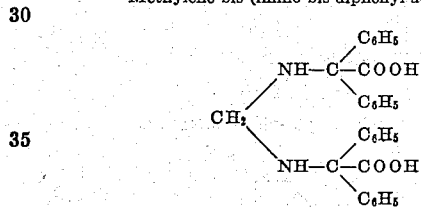

These diimines are characterized by the general formula:

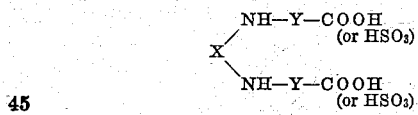

where X represents the aliphatic chain and Y an aldehyde or ketone residue which may be substituted and such substitutions may be a sulphonic group as well.

*Formation of dyes*

The above bis-(diazo-imino) compounds when mixed with proper proportions of suitable coupling components yield valuable compositions for use in the formation of dyes which may be prepared in substance or affixed to textile fibres by very simple manipulation and application.

Such compositions are prepared as follows:—

*Example 5*

95 parts of disodium salt of bis-4-chloro-1-methoxy-2-diazoethylene-bis-(imino acetic acid) are mixed with 110 parts of aceto-acet-alpha-naphthylamid. The resulting greyish white powder is stable to storage. It is very readily soluble in water with the suitable addition of alkali. Upon treatment with organic acids the solution of this mixture readily yields a clear greenish yellow pigment.

The following chart illustrates various compositions and resultant shades of the azo dyes obtainable from each. The amounts of each component in the mixture are approximately molecular.

| Bis—(diazo imino) compounds | Coupling components | Shades |
|---|---|---|
| See chart formula (4) | Beta-hydroxy-naphthoic-acid-o-toluidid. | Red. |
| See chart formula (6) | Beta-hydroxy-naphthoic-acid-anilid. | Orange. |
| See chart formula (3) | Beta-hydroxy-naphthoic-acid-anilid. | Blue. |
| See chart formula (11) | Beta-hydroxy-naphthoic-acid-anilide. | Reddish blue. |
| See chart formula (11) | Beta-hydroxy-naphthoic-acid-o-toluidid. | Greenish blue. |
| See chart formula (8) | Beta-hydroxy-naphthoic-acid-o-anisidid. | Bordeaux. |
| See chart formula (5) | Beta-hydroxy-naphthoic-acid-o-anisidid. | Blueish red. |
| See chart formula (9) | Diaceto-acet-toluidid | Yellow. |
| See chart formula (9) | Phenyl-methyl-pyrazolon. | Reddish yellow. |
| See chart formula (7) | Beta-hydroxy-naphthoic-acid-m-xylidid. | Scarlet. |
| See chart formula (4) | 2-hydroxy-carbazol-o-carboxy-o-anisidid. | Brown. |
| See chart formula (1) | Diaceto-acet-benzidid. | Yellowish orange. |

The following coupling components may also be employed:—

Aceto-acetyl-alpha-naphthylamine,
Aceto-acetyl-beta-naphthylamine,
2'3'hydroxynaphthoic acid-2-naphthylamide,
2'3'-hydroxynaphthoic acid-3-chloranilide,
2'3'-hydroxynaphthoic acid-5-chloro-2-anisidide,
2'3'-hydroxynaphthoic acid-3-nitranilide,
2'3'-hydroxynaphthoic acid-3-nitranilide,
2.3-hydroxynaphthoyl-ortho-chloraniline,
2.3-hydroxynaphthoyl-meta-toluidine,
2.3-hydroxynaphthoyl-5-chloro-1.2-anisidine,
2.3-hydroxylnaphthoyl-dianisidine,
Alpha-hydroxy-naphtho-carbazole-carboxylic acid-5-nitro-o-anisidine,
Alpha-hydroxy-naphtho-carbazole-carboxylic acid-xylidine.

For the preparation of the dyestuff in substance, 20 parts of the mixture are dissolved in 150 parts water and 6 parts sodium hydroxide 32 Bé. If necessary a minimum quantity of a suitable solvent such as alcohol or glycol ether is added to assist the solubility. The solution is acidified in excess with formic acid or acetic acid and heated until maximum formation of the dyestuff occurs.

Suitable substrata may be used if desired. The pigment is filtered, dried and ground.

The most important use of these compositions is for the application of colors in dyeing and printing of textile fibres.

The following method of application will illustrate the procedure:—

1 mol. of the bis-(diazo-imino) compound is mixed with
2 mols of a coupling component. Then
2 parts of this mixture are dissolved in
7 parts water,
½ part para soap,
1½ parts caustic soda solution 30 Bé.,
2½ parts cellosolve or denatured alcohol and the resulting solution thickened to a paste with
15 parts starch—gum tragacanth.

This paste is printed on the cotton cloth and hung up to dry. The printed cloth may be developed immediately after drying, or the dried printed cloth stored until required by the printer. The developing is done by placing the cloth in an ager and steaming in the presence of acetic, formic or other organic acid vapor for five minutes. It is then soaped hot, rinsed well and dried.

Where the use of an ager is inconvenient, the developing may be done by immersing the printed cloth in a warm bath of acetic, formic or other acids, or mixtures thereof, in the presence of Glauber's salt. This developing bath is heated until the shades have reached maximum fullness. Furthermore, the printed material may be padded with the acid mixture using the well known padding method after which the material is dried with heat, rinsed, soaped, washed well and dried.

The printing paste of this mixture, when printed on cotton or rayon, and developed, yields a bright clear shade of excellent fastness to light, rubbing, kier boiling and chlorine.

What we claim is:—

1. As a new compound, the aliphatic diimino compound having the formula

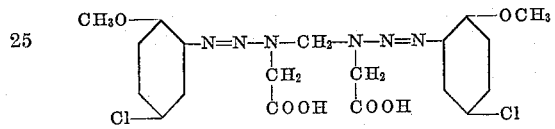

2. As a new compound, the aliphatic diimino compound producible by combining 2 molecules of diazotized 4-chlor-2-amino-anisol with 1 molecule of ethylene-diimino-diacetic acid, which compound is water-soluble and which is capable of being split up into diazo-4-chlor-2-amino-anisol and ethylene-diimino-diacetic acid upon treatment with acid.

3. A process for the production of aliphatic diimino compounds which consists in reacting upon 1 mol. of ethylene-diimino-diacetic acid with 2 mols of diazotized 4-chlor-2-amino-anisol.

4. Diazoimino compounds having the formula

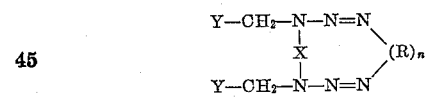

wherein R is the aryl radical of a diazotized aromatic amine, X is a divalent saturated aliphatic hydrocarbon radical, Y is a water solubilizing substituent selected from the group consisting of carboxyl and sulfo, and $n$ is at least one and not more than two.

5. Diazoimino compounds having the formula

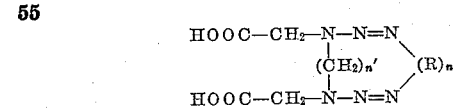

wherein R represents the aryl radical of a diazotized aromatic amine, $n$ is at least one and not more than two, and $n'$ signifies an integer.

6. Diazoimino compounds having the formula

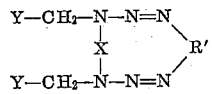

wherein R' represents the aryl radical of a tetrazotized aromatic diamine, X stands for a divalent saturated aliphatic hydrocarbon radical, and Y designates a substituent of the group consisting of carboxyl and sulfo.

7. Diazoimino compounds having the formula

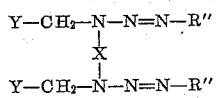

wherein each R" stands for the aryl radical of a diazotized aromatic amine, X stands for a divalent saturated aliphatic hydrocarbon radical, and Y designates a substituent of the group consisting of carboxyl and sulfo.

8. Diazoimino compounds having the formula

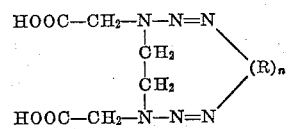

wherein R represents the aryl radical of a diazotized aromatic amine and $n$ is at least one and not more than two.

9. Diazoimino compounds having the formula

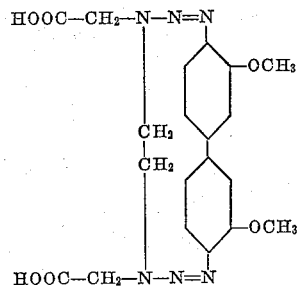

10. Diazoimino compounds having the formula

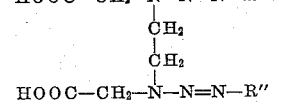

wherein each R" represents the phenyl radical of a diazotized amine of the benzene series.

11. Diazoimino compounds having the formula

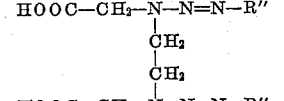

wherein each R" represents the chlor-methoxyphenyl radical of a diazotized chlor-anisidine.

EUGENE A. MARKUSH.
MARK S. MAYZNER.
JULIUS MILLER.